United States Patent [19]

Desai et al.

[11] Patent Number: 5,515,283
[45] Date of Patent: May 7, 1996

[54] METHOD FOR IDENTIFYING HIGHWAY ACCESS RAMPS FOR ROUTE CALCULATION IN A VEHICLE NAVIGATION SYSTEM

[75] Inventors: Simon Desai; Haruhisa Tamai, both of Sunnyvale, Calif.

[73] Assignee: Zexel Corporation, Japan

[21] Appl. No.: 263,604

[22] Filed: Jun. 20, 1994

[51] Int. Cl.⁶ .................................................. G06F 165/00
[52] U.S. Cl. .......................... 364/443; 364/449; 340/990; 340/995
[58] Field of Search ................................ 364/443, 444, 364/449; 73/178 R; 340/988, 990, 995

[56] References Cited

U.S. PATENT DOCUMENTS

| | | | |
|---|---|---|---|
| 3,845,289 | 10/1974 | French | 364/444 |
| 4,570,227 | 2/1986 | Tachi et al. | 364/444 |
| 4,608,656 | 8/1986 | Tanaka et al. | 364/443 |
| 4,611,293 | 9/1986 | Hatch et al. | 364/559 |
| 4,672,565 | 6/1987 | Kuno et al. | 364/457 |
| 4,673,878 | 6/1987 | Tsushima et al. | 364/444 |
| 4,723,218 | 2/1988 | Hasebe et al. | 340/990 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/449 |
| 4,797,841 | 1/1989 | Hatch | 364/559 |
| 4,831,563 | 5/1989 | Ando et al. | 364/457 |
| 4,862,398 | 8/1989 | Shimizu et al. | 364/457 |
| 4,914,605 | 4/1990 | Loughmiller, Jr. et al. | 364/443 |
| 4,918,609 | 4/1990 | Yamawaki | 364/449 |
| 4,926,336 | 5/1990 | Yamada | 364/449 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nuimura et al. | 364/449 |
| 4,996,645 | 2/1991 | Schneyderberg Van der Zon | 364/449 |
| 4,999,783 | 3/1991 | Tenmoku et al. | 364/449 |
| 5,040,122 | 8/1991 | Neukirchner t al. | 364/449 |
| 5,046,011 | 9/1991 | Kakihara et al. | 364/449 |
| 5,060,162 | 10/1991 | Ueyama et al. | 364/449 |
| 5,177,685 | 1/1993 | Davis et al. | 364/443 |
| 5,283,743 | 2/1994 | Odagawa | 369/449 |
| 5,287,297 | 2/1994 | Ihara et al. | 364/449 |
| 5,297,050 | 3/1994 | Ichimura et al. | 364/449 |

OTHER PUBLICATIONS

R. L. French, "Map Matching Origins Approaches and Applications," Rober L. French & Associates, 3815 Lisbon St., Suite 201, Fort Worth, Texas 76107, USA, pp. 91–116.

*Primary Examiner*—Gary Chin
*Attorney, Agent, or Firm*—Townsend and Townsend and Crew

[57] ABSTRACT

A method for identifying highway access ramps in a database medium for use as locations for route calculation. Initially, first road segments which belong to a highway and which are connected to at least one access ramp are identified. The first road segments are sorted according to the highway to which they belong. A highway direction is determined for each first road segment. The first road segments belonging to a first highway are sorted according to highway direction. The first road segments belonging to the first highway and of each highway direction are sorted according to position, thereby forming a highway segment list for each direction of the first highway. Highway access ramps are identified for each first road segment in the highway segment list. The locations for the highway access ramps are stored in the database medium. Highway access ramps are identified in this manner for each highway in the database medium. A method and apparatus for determining a route from a starting vehicle position to a destination using a vehicle navigation system are also provided.

12 Claims, 8 Drawing Sheets

METHOD FOR IDENTIFYING HIGHWAY ACCESS RAMPS FOR ROUTE CALCULATION IN A VEHICLE NAVIGATION SYSTEM

BACKGROUND OF THE INVENTION

The present invention relates to vehicle navigation systems. More specifically, the present invention provides a method for identifying highway access ramps as locations for the calculation of routes using a vehicle navigation system. The present invention also provides a method and apparatus for determining a route based on the location of a highway access ramp using a vehicle navigation system.

In the map databases employed by today's vehicle navigation systems, different levels of detail are provided for different types of geographic regions. Metropolitan regions, which include urban and suburban areas, generally have a high level of detail and account for much of the detailed map information stored in the databases. By contrast, very little detail is provided for rural areas and outlying towns lying in the sparsely populated regions which interconnect metropolitan regions. These regions are referred to herein as highway regions. The term "highway" herein includes roads which meet several criteria discussed below and is used to describe, among other things, highways, freeways, and expressways.

When using a vehicle navigation system, a user typically selects a destination so that the system may calculate a route and provide guidance information to the destination. For example, if the user wishes to travel to a particular street intersection in an urban area, she may select the intersection as provided by the map database. The level of detail for urban areas provided by available map databases is generally such that most, if not all, street intersection information is available to users. However, because map databases do not provide detailed coverage of highway regions, many destinations in these regions are not available for route calculation.

The level of detail provided by available map databases for highway regions typically includes the highways themselves and the major roads to which they are connected. More detailed surface street information is generally not provided. Thus, the destinations to which users would most likely be heading in highway regions are usually unavailable for route calculation purposes. Therefore, there is a need to provide users of vehicle navigation systems with destination options in highway regions. Highway access points (i.e., on-ramps and off-ramps) are possible destination options, but available map databases do not provide information regarding such access points in a form which identifies them as such and which may be presented to the user as a destination option.

The availability of highway access points for route calculation and guidance would be advantageous in situations in which the user would like to find the nearest entrance to a highway, for example. Another situation in which the availability of highway access points for this purpose would be an advantage is where the user is familiar with the surface streets near her highway region destination and/or near her present location in an urban area. In such a case, she only needs to specify the highway exit near her highway region destination to receive sufficient route guidance.

In view of the foregoing, it is evident that there is a need to provide users of vehicle navigation systems with highway access points as destination options for the purpose of route calculation and guidance. The present invention meets that need.

SUMMARY OF THE INVENTION

The present invention provides a method by which a list of highway access point locations may be a priori compiled for the purpose of route calculation in a vehicle navigation system. The invention begins with a conventional map database. The method of the invention identifies the highways of interest and their associated access points (e.g., on-ramps and off-ramps, intersections, etc.). The access ramps are then identified by the roads from which access to the highway is gained or to which access from the highway is provided. The locations of the access ramps are then stored in an auxiliary database for use in route calculation. When a user of the vehicle navigation system knows, for example, the highway on-ramp to which she desires to travel, she may select the on-ramp as her destination from the options presented by the system. The system will then calculate at least one route to the on-ramp based upon the location stored in the auxiliary database for that on-ramp.

According to the present invention, a method is provided for identifying highway access ramps in a database medium for use as locations for route calculation. Initially, first road segments which belong to a highway and are connected to at least one highway access ramp are identified. The first road segments are sorted according to the highway to which they belong. A highway direction is determined for each first road segment. The first road segments belonging to a first highway are sorted according to highway direction. The first road segments belonging to the first highway and of each highway direction are sorted according to position, thereby forming a highway segment list for each direction of the first highway. Highway access ramps are identified for each first road segment in the highway segment list. The locations for the highway access ramps are stored in the database medium. Highway access ramps are identified in this manner for each highway in the database medium.

A method and apparatus for determining a route from a starting vehicle position to a destination using a vehicle navigation system are also provided. The apparatus includes a database medium in which is stored the locations of a plurality of highway access ramps. A user interface is also included by which a user may select a first highway and a first highway access ramp as the destination. A processor is coupled to the database medium and the user interface which performs a number of functions. The processor identifies a first location from the database medium in response to the user's selection of a first highway access ramp as the destination. The processor then identifies a plurality of connected road segments in the database medium which connect the starting vehicle position and the first location. Finally, the processor identifies at least one route from the starting vehicle position to the destination. The identified routes comprise some subset of the plurality of connected road segments previously identified. A display is coupled to the processor for presenting a subset of the plurality of highway access ramps to the user for selection of a destination. The display also communicates the identified routes to the user.

A vehicle navigation system which incorporates the above-described features is also described herein.

A further understanding of the nature and advantages of the present invention may be realized by reference to the remaining portions of the specification and the drawings.

DESCRIPTION OF THE PREFERRED EMBODIMENT

The present invention relates generally to commonly assigned, copending United States patent applications for CALIBRATION METHOD FOR A RELATIVE HEADING SENSOR, Ser. No. 07/883,859 filed on May 15, 1992, ROUTE GUIDANCE ON/OFF-ROUTE STATE FILTER, Ser. No. 07/884,749 filed on May 15, 1992, POSITION CORRECTION METHOD FOR VEHICLE NAVIGATION SYSTEM, Ser. No. 08/000,950 filed on Jan. 5, 1993, and METHOD FOR SELECTING A DESTINATION IN A VEHICLE NAVIGATION SYSTEM, Ser. No. 08/099,207 filed on Jul. 29, 1993, the entire specifications of which are incorporated herein by reference.

Figure 1:
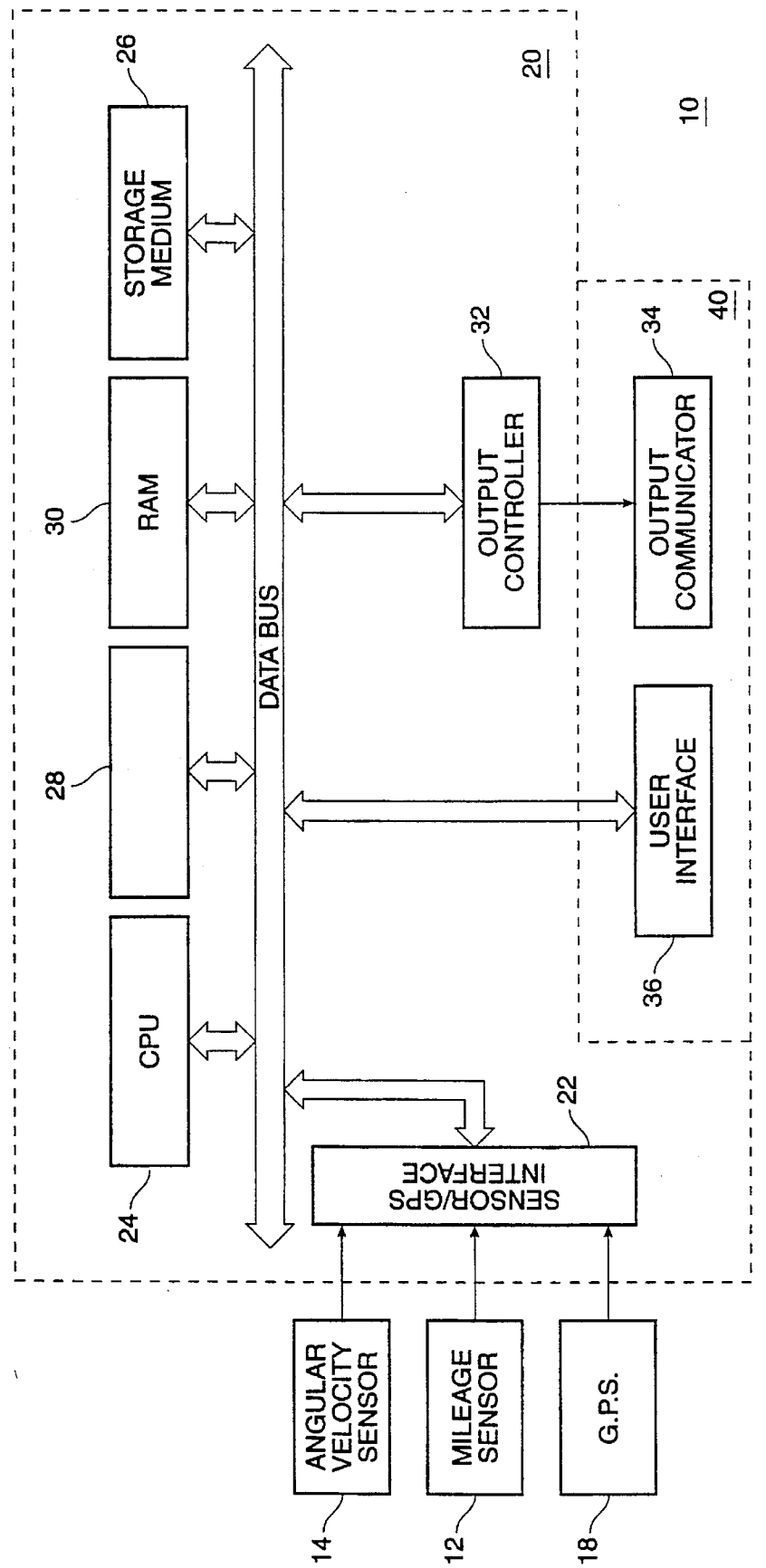
FIG. 1 is a block diagram of a vehicle navigation system for use with the present invention.

FIG. 1 is a block diagram of a specific embodiment of a vehicle navigation system 10 for use with the present invention. Sensors 12 and 14 and GPS receiver 18 are coupled to computing means 20 through sensor/GPS interface 22. In typical embodiments, mileage sensor 12 comprises an odometer, and angular velocity sensor 14 comprises a gyroscope, or a differential odometer coupled to the wheels of the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A database containing map information may be stored in database medium 26, with software directing the operation of computing means 20 stored in main memory 28 for execution by CPU 24. Memory 28 may comprise read-only memory (ROM), or reprogrammable non-volatile memory such as flash memory or SRAM. System RAM 30 permits reading and writing of the information necessary to execute such software programs. Database medium 26 may comprise non-volatile memory, a hard disk drive, CD-ROM, or an integrated circuit in which digitized map information has been stored. Output controller 32, which may comprise a graphics controller, receives data processed by CPU 24 and transmits the data to display console 40 which includes output communicator 34, usually comprising a display screen. The user may input data, such as a desired destination, through user interface 36, typically comprising a keyboard.

The map database stored in database medium 26 preferably comprises positional data such as, for example, latitude and longitude coordinates, to describe road intersections, road segments, landmarks and points of interest, and other geographical information. The data base may further comprise data representing characteristics of roads or places on the map, such as road and place names, road features such as dividers, one-way restrictions, surface, speed limit, shape, elevation, and other properties. Using the data stored in the map data base, the vehicle navigation system generates one or more possible positions of the vehicle by comparing the dead-reckoned position to the road segments, intersections, and other geographical locations stored in the data base. The system then filters the set of position possibilities and selects from the remaining position possibilities a position deemed to be the current position of the vehicle.

According to one embodiment of the present invention, the map database information stored in database medium 26 is used to create an additional access ramp database in which the locations of highway access ramps are stored. The access ramp database may include the names of the entrances and exits for each highway, the city or county name for each entrance and exit, the distances between each exit, the distances between each entrance, and the highway name for each direction (e.g., US-101 South). In some embodiments of the invention, POIs such as service stations, restaurants, and lodging are included in the additional database for each exit.

Figure 2:
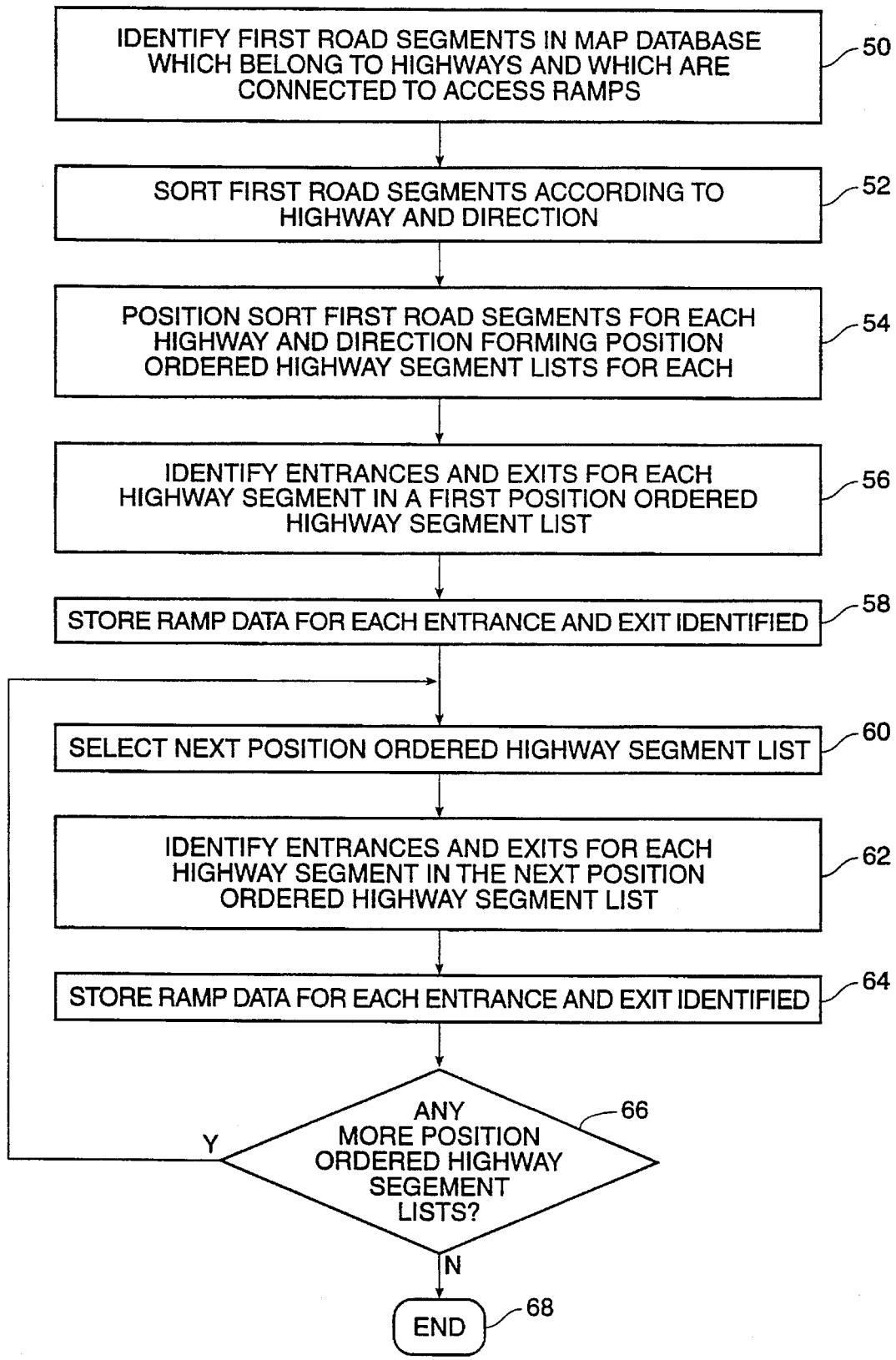
FIG. 2 is a flowchart describing the generation of an access ramp database according to one embodiment of the invention.
Figure 3:
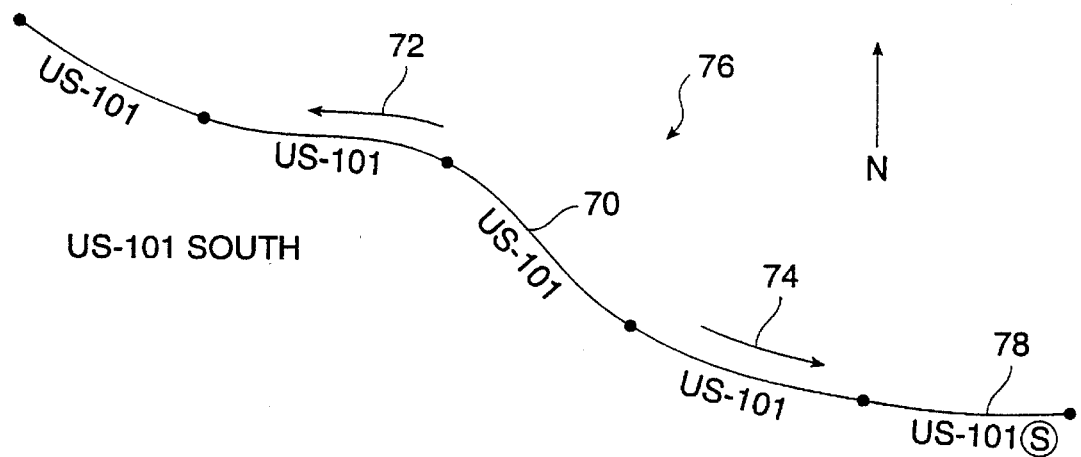
FIG. 3 shows a portion of US-101 South with reference to determining direction for a highway segment.

The creation of access ramp database according to one embodiment of the invention is represented by the flowchart of FIG. 2. Initially, a highway database is created which includes all road segments in the original map database which belong to highways and which are connected to an access ramp of some kind (step 50). These road segments are selected based on the following criteria. A road segment is considered a highway segment for storage in the highway database if:

1) the speed limit for the road segment exceeds some predetermined amount, such as, for example, 45 MPH;

2) the segment is highway numbered, i.e., US-101, I-5, etc.;

3) the segment is not a ramp (some ramps have relatively high speed limits and are also highway numbered); and 4) the road segment is connected to at least one entrance or exit that is a ramp or connector, i.e., a highway or expressway segment that has no ramps is not included in the database.

The road segments included in the highway database are singly and doubly digitized. Singly digitized refers to road segments in which both directions of travel are represented. Doubly digitized refers to road segments which represent only one of the two directions of travel, i.e., there exist road segments for both directions of travel. If a road segment is singly digitized, one segment for each direction of travel is stored in the highway database.

Entrances and exits which qualify a particular road segment for storage in the highway database are those which satisfy any of the following criteria. The following types of segments qualify as an entrance:

1) Segments which connect two roads together where one road is elevated with respect to the other. In the map database provided by NavTech, these correspond to segments having a Standard Interface Format (SIF) link class of 6 (e.g., ramps). As will be discussed below, the name of an entrance is derived from the preferred name of the road segment to which the ramp is attached; "no-name" road segments to which the ramp is connected are ignored, the name of the next connecting road segment being used. Turn restrictions and one-way restrictions are also checked to determine whether the ramp may be approached from the road segment.

2) Highway or expressway segments which connect to other highways, e.g., segments having an SIF link class of 1 or 2. The name of the entrance is the name of the entering highway.

3) Segments which connect two roads where both roads have the same elevation, e.g., segments having an SIF link class of 8 (e.g., connectors).

The reason for including an entrance onto another highway is both for consistency (i.e., all entrances are included), and because an out-of-town driver may not be familiar with the local area, but may be familiar with the highway. Therefore, the driver may only need to select a known highway as her destination.

The following types of segments qualify as an exit:

1) Segments which connect two roads together where one road is elevated with respect to the other, e.g., segments having an SIF link class of 6 (e.g., ramps). In this case, the sign attribute attached to the ramp as it leaves the highway is the preferred name of the exit.

2) Highway or expressway segments which connect to other highways, e.g., segments having an SIF link class of 1 or 2. The name of the exit is the name of the other highway.

3) Segments which connect two roads where both roads have the same elevation, e.g., segments having an SIF link class of 8 (e.g., connectors).

Other streets accessible from the ramp may also be included in the ramp database for the particular exit. The reason for wanting to include an exit onto another highway is both for consistency (i.e., all exits are included), and because a driver may be familiar with a particular highway. In such a case, when the driver selects a destination, she may only need route guidance to the exit for the highway she knows.

Once all road segments belonging to highways and connecting to access ramps have been determined and stored in the highway database, the stored segments are sorted according to the highway to which they belong and according to their direction of travel (step 52). For example, all segments belonging to southbound Highway 101 are grouped together. Highway segments for singly digitized highways are duplicated so that entries for those segment may be stored for both directions of those highways. Highway segments from doubly digitized highways which have no direction suffixes are also initially duplicated for the purpose of determining to which side of their respective highways these segments belong.

To determine the direction of travel for the doubly digitized highway segments having no associated direction suffixes, an exploration along the highway is performed using the information stored in the original map database. Starting from both ends of a segment 70, the exploration proceeds backwards and forwards (arrows 72 and 74) along the highway 76. Once a highway segment is found that has a direction suffix (e.g., segment 78), this direction is presumed to be the direction of the highway segment in question. If such a direction suffix is not found before a singly digitized section of the highway is encountered, exploration continues along the singly digitized section until further doubly digitized segments are encountered. In one embodiment, text on entrance signs attached to ramps entering doubly digitized highway segments are used to determine direction. In another embodiment, highway numbering conventions are used to help determine the direction of highway segments. An example of such a convention is that odd numbered highways travel north/south, while even numbered highways travel east/west.

Figure 4:
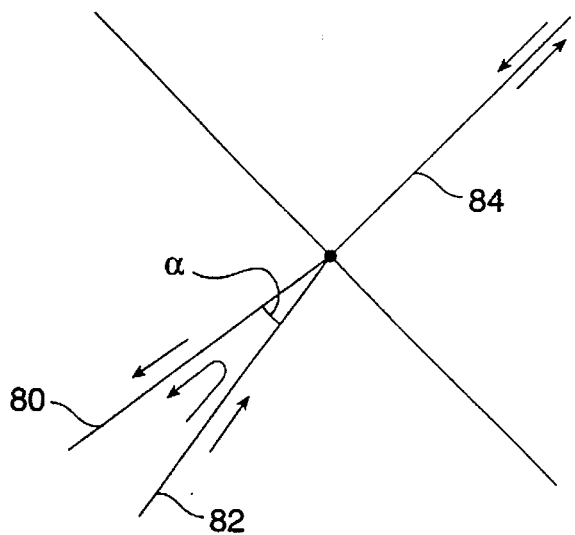
FIG. 4 shows a doubly digitized highway turning into a singly digitized highway.

There are situations in which the above-described method may not be successful in determining the direction of a particular highway segment. One of these situations is where a direction conflict exists, i.e., two segments are found with different direction suffixes. This could occur as a result of a road configuration as shown in FIG. 4. Since available map databases do not always place turn restrictions where a double digitized highway (segments 80 and 82) turns into a single digitized highway 84 (e.g., so that a U-turn is prevented), a U-turn exploration onto the opposite direction of the same highway may occur, i.e., from segment 82 to segment 80. According to one embodiment of the present invention, such a U-turn exploration is prevented by introducing an angle threshold into the exploration algorithm. Thus, if the angle $\alpha$ formed by segments 80 and 82 is less than some predetermined angle, then a turn restriction is generated that prevents a U-turn onto the opposite highway direction. In one embodiment, the angle threshold is 45 degrees.

In some cases, there is no suffix associated with a particular highway segment and the highway segment is not connected to another highway segment with the same highway name that does have a suffix. In such cases, there may be no way to determine the direction of the highway segment. According to one embodiment, a file is manually created which defines what the suffix should be for each of these "bad" segments. The compiler is then changed to retrieve the direction suffix from this file when such a segment is encountered. In another embodiment, the original map database is manually modified to include the suffix of this highway segment.

Once the highway segments have been sorted according to highway and direction, they are then position sorted into position ordered highway segment lists (step 54 of FIG. 2). A separate position ordered highway segment list is generated for each side of each highway. The lists are ordered in the direction of travel. For example, the northernmost segment stored for southbound Highway 101 is the first segment in the position ordered highway segment list for US-101 South.

Once position ordered highway segment lists have been generated for each highway in the map database, the entrances and exits for one highway at a time are identified (step 56). Data for each entrance/exit so identified are then stored in the access ramp database for that highway (step 58). This is done for each highway in the map database (steps 60–68).

Figure 5A:
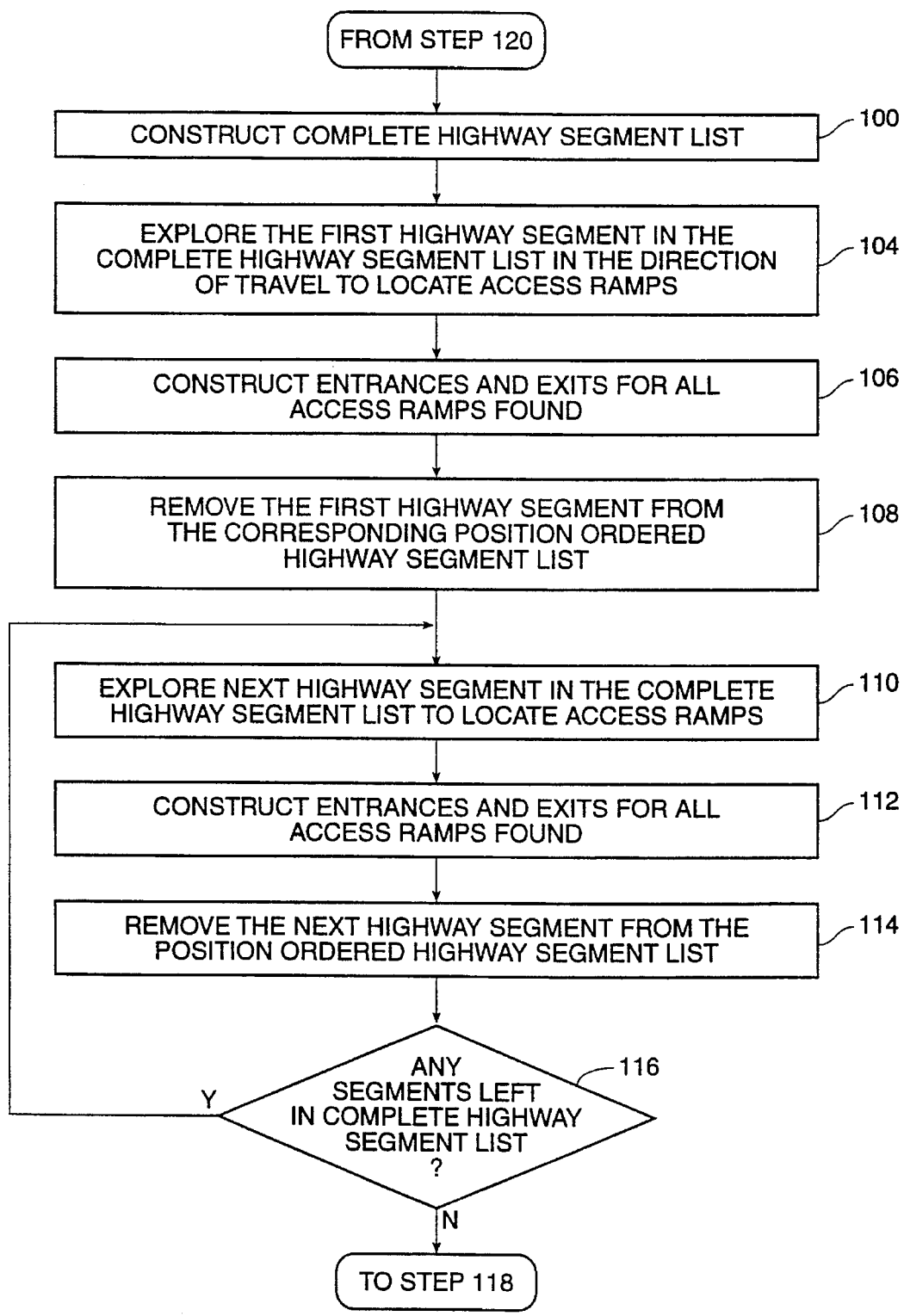
FIG. 5 (comprising FIGS. 5A and 5B) is a flowchart describing the identification of entrances and exits for each highway in the map database.
Figure 5B:
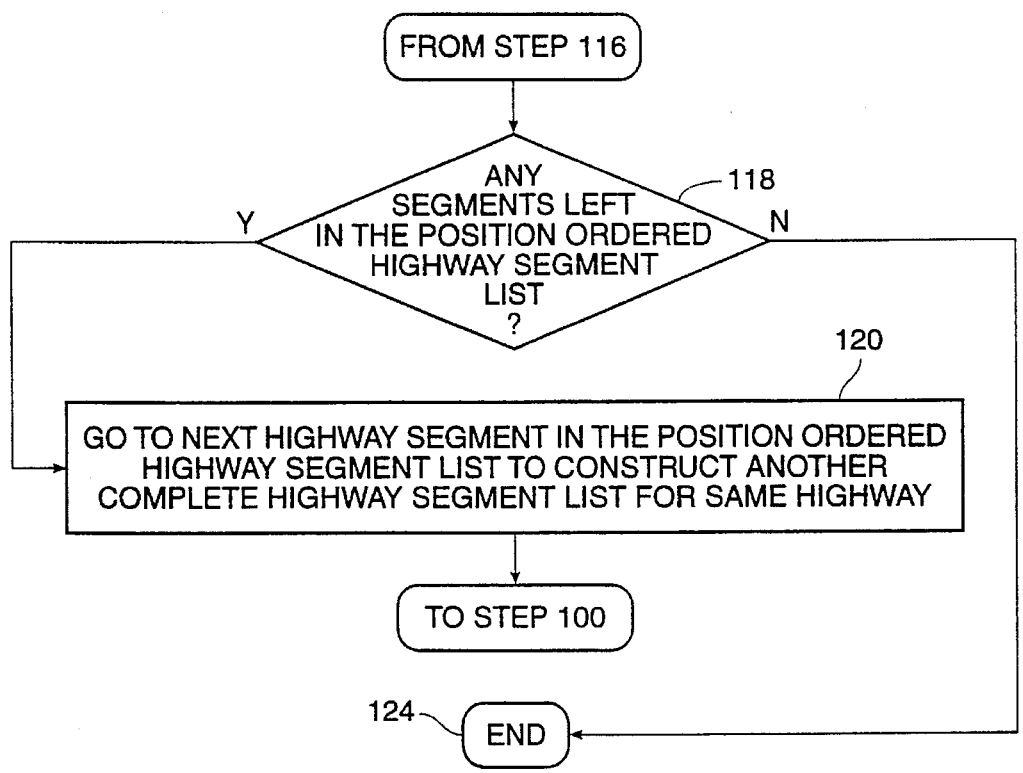
Figure 6:
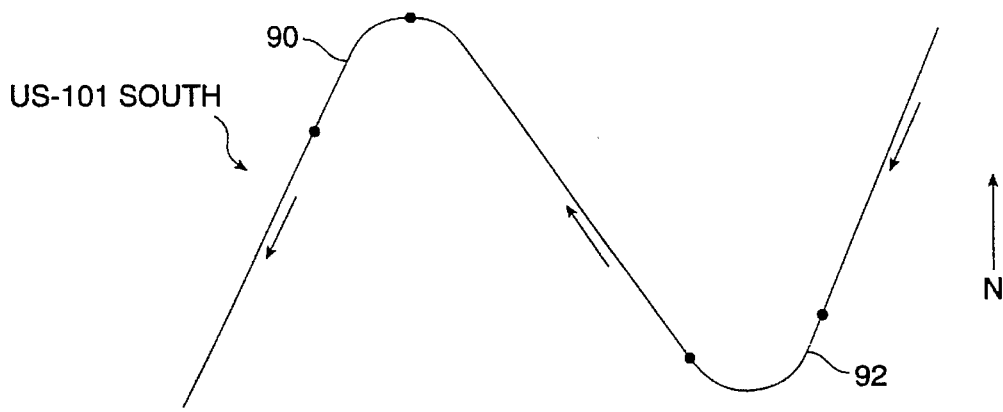
FIG. 6 shows a portion of US-101 South which doubles back on itself.

The entrances and exits for each highway are identified, in one embodiment, according to the flowchart of FIGS. 5A and 5B. Initially, the position ordered highway segment list for each highway is explored for the purpose of constructing a complete highway segment list for each highway direction (step 100). Starting with a double digitized highway segment at the beginning of the highway, and using the data in the original map database, an exploration is performed in both the forward and backward directions from the segment along the highway. All of the segments of the highway are stored in the order they are encountered in the direction of travel. This list which includes all of the road segments for a highway is referred to herein as the complete highway segment list. The complete highway segment list is necessary for accurately ordering the exits and entrances for a particular highway because the position ordered highway segment list cannot be relied upon to always store highway segments in the order in which they are encountered when actually traveling on the highway. A situation when highway segments would be stored out of order may arise, for example, where the highway doubles back on itself as shown in FIG. 6. In this instance, segment 90 is farther North than segment 92 even though segment 90 is farther along Highway 101 South in the direction of travel.

Once a complete highway segment list is constructed for a highway, the complete highway segment lists is examined in the direction of travel to locate the entrances and exits connected to the highway segments which are stored in the position ordered highway segment list (step 104 of FIG. 5A). When such access ramps are found, entrances and exits are constructed for the particular highway segment (step 106) as discussed below. Once the exits and entrances for a particular highway segment have been generated, that segment is removed from the position ordered highway segment list (step 108), and exploration along the complete highway segment list is continued until the list is exhausted (steps 110–116). In some cases, a complete highway segment list may be exhausted before the corresponding position ordered highway segment list is exhausted. This may occur in situations where the highway associated with the two lists has a logical discontinuity (e.g., a segment or group of segments without a name), or where an actual physical discontinuity exists (e.g., earthquake or flood damage). In such situations, there will need to be more than one complete highway segment list constructed for that particular position ordered highway segment list. If this occurs (step 118), then the next highway segment in the position ordered segment list is found (step 120) and the above-described steps are repeated, thereby constructing a new complete highway segment list for that highway starting at the next highway segment in the position ordered highway segment list. The exploration is continued in this manner until the position ordered highway segment list is exhausted (step 118) at which time the procedure ends (step 24). This procedure is carried out for each position ordered highway segment list.

Access ramps located in the above-described procedure are identified as entrances in the following manner. Access ramps connected to highway segments in the position ordered segment list are explored backwards to identify all streets to which the ramp is connected. One-way and turn restrictions are observed to eliminate some of the possible connecting entrance streets. If a street is found that has the same numbering, it is not included as an entrance, since it is most likely an exit from the same highway. In some embodiments, the highway may be included as its own entrance if the highway changes from one highway numbering to another. This typically happens when a highway splits into two highways.

Figure 7:
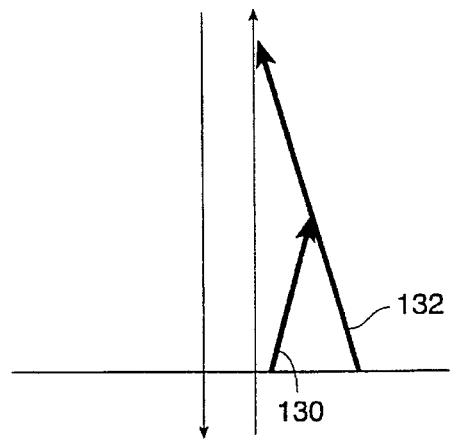
FIG. 7 shows two entrance ramps to one highway direction from the same road.

Several different scenarios may occur where a two-way street enters a highway. For example, if a two-way street has one entrance onto the highway for both directions of travel on the two-way street, then only one entrance name is stored in the database. If, however, a two-way street has two entrance ramps (i.e., one for each direction of the two-way street), then the entrances may be filtered into one if they are adjacent along the highway as shown in FIG. 7. If a street enters the highway in two distinct and remote places, a heuristic based on the distance between the ramp entrances may be used to determine whether both entrances 130 and 132 should be stored, or whether they should be resolved into one.

Figure 8:
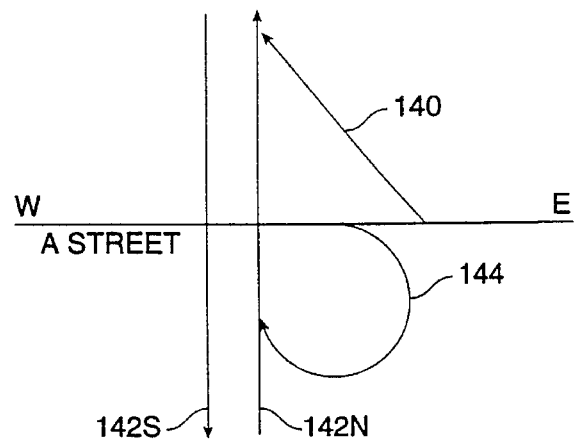
FIG. 8 shows a different configuration of two entrance ramps to one highway direction from the same road.

There may be drawbacks to reducing two entrances to only one entrance. One such drawback may be understood with reference to FIG. 8. Assume that the destination segment for route calculation is ramp segment 140 connected directly to highway 142 N. If segment 140 is chosen and the driver is travelling eastbound on A street, they would have to make a U-turn to get to segment 140, when what they really want as a destination is segment 144. In such a situation, one approach is to list A street twice in the entrance list, once as A Street E, once as A Street W where such directional information is available. Another approach is to store the highway segment beyond both entrances as the destination when either entrance is selected as the destination. That way the route calculation will choose the appropriate entrance depending upon the direction of travel along A Street.

Other problems may be encountered in identifying an entrance ramp. For example, when searching backwards from the ramp to determine the entrance name, small access roads may be encountered which are not the major road with which a driver would normally associate the entrance. In such a case, the exploration may be continued until a higher class road segment is found. In some embodiments, the name of more than one road segment may be associated with a particular entrance and stored in the access ramp database.

There can also be multiple streets which allow turns onto a highway entrance ramp. One embodiment of the invention treats these as separate entrances.

In highway regions, two highways often intersect without ramps, e.g., a simple intersection. One embodiment of the invention takes turn restrictions into account and treats the highway segments connected to the intersection as entrances and exits to and from each of the other segments connected to the intersection subject to the turn restrictions.

Once properly identified and stored in the additional database, an entrance ramp segment may be used as a destination for route guidance as described above with reference to FIG. 1.

Figure 9A:
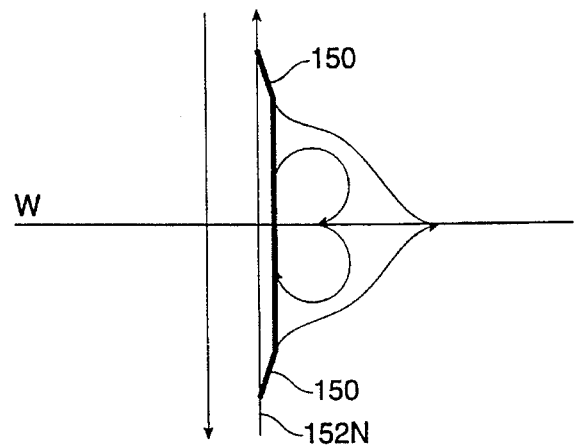
FIGS. 9A–9D show examples of ambiguous exit ramp configurations.
Figure 9B:
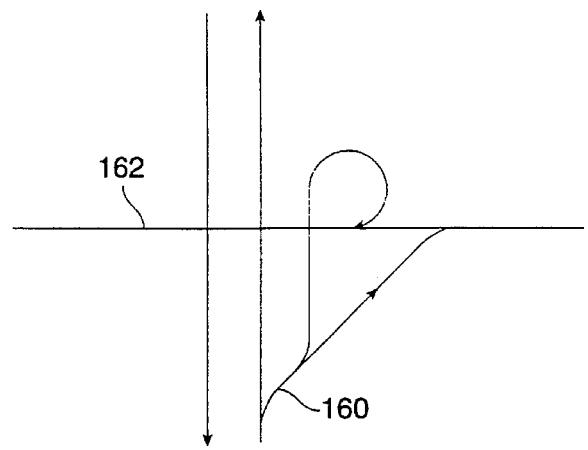
Figure 9C:
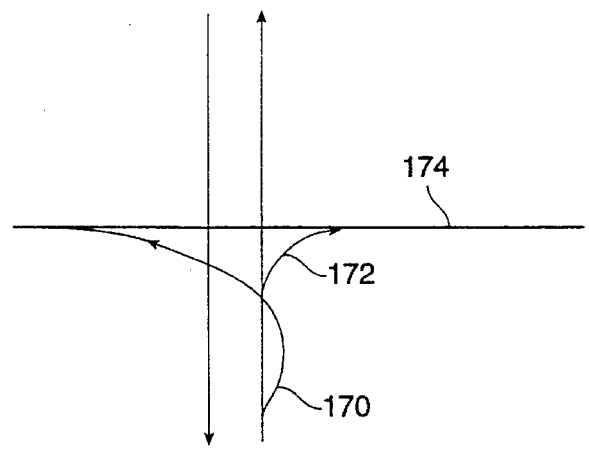
Figure 9D:
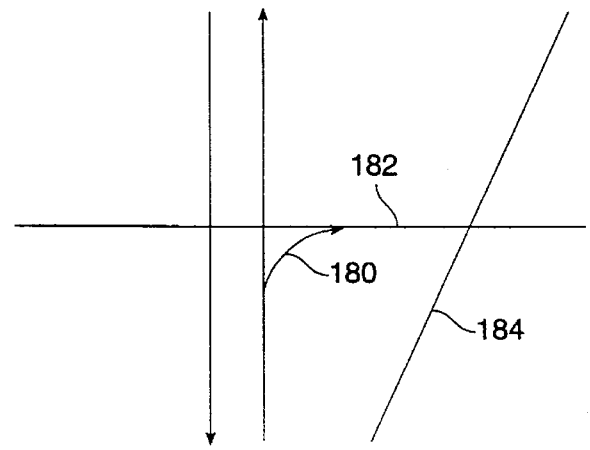

The identification of exit ramps proceeds similarly to the identification of entrance ramps described above, except that additional information regarding the road segments to which an exit provides access is generally available. For example, exits have "Toward" and "Branch" signs which may be used both to identify the roads to which a direct connection is made, and to determine if there are additional major roads that do not directly connect to the ramp. Moreover, the additional information provided by such signs may be used to clear up ambiguous situations such as, for example, situations where an exit ramp segment 150 reconnects to a highway 152 N as an entrance (FIG. 9A); where an exit ramp segment 160 branches to both directions of the same road 162 (FIG. 9B); where exit ramps 170 and 172 for different directions of the same road 174 are close together (FIG. 9C); and where an exit ramp segment 180 connects to a minor access road 182 rather than to a major road 184 (FIG. 9D). Not only may the solutions described above be used to clearly identify the exit ramp, sign information may also be used to resolve these issues.

Sign text typically uses full road names in contrast to the abbreviated road names employed by existing map databases. Thus, according to one embodiment, when road sign text is used in the described manner, a conversion or normalization to the abbreviated name is performed, i.e., Boulevard becomes Blvd. Road prefix and suffix information may also be normalized into the abbreviated format employed by the map database, i.e., North becomes N. In a further embodiment, once sign text normalization is complete, the sign is validated. Validation involves a determination of whether the normalized text represents an existing road. This reduces the chance of falsely designating a POI or city name as an exit.

As with the entrance ramps, the exit ramp segment which provides access to a desired street may be used as a destination for route calculation. In cases where there is no street found (e.g., only a sign indicating a street), the ramp segment just off the highway is used as a destination.

Once the ramp database has been compiled, the user of the vehicle navigation system may select a highway access point as a destination in the following manner. The user first selects a highway from a highway list shown on the display screen. Both numbered highway names and local highway names may be given. For example, US-101 is known variously as the Redwood Highway, the Bayshore Freeway, the Ventura Freeway, and the Hollywood Freeway. According to one embodiment, each highway direction is identified separately. For example, US-101 North and US-101 South are separate selections.

Once a highway and a direction are chosen, the system prompts the user to select either an entrance or an exit as her destination. Entrances and exits are presented separately on the display screen. When displaying a list of access points, the system highlights the closest access point to the current vehicle position and places it in the middle of the display screen. The driver may scroll up or down the list of access points, the distance from the current vehicle position to each being given when each is highlighted.

In another embodiment, the user is presented with a list of highways without regard to direction. Once a highway is chosen, the user is shown a list of highway access points without regard to whether they are entrances or exits, or the highway direction to which the access points provide access. Once the user selects and access point from this list, she is prompted to select either an entrance or an exit (and in one embodiment, the highway direction). The system's route calculation algorithm is then given all access points which meet the selected criteria, and the best access point is automatically chosen. For example, segments 140 and 144 of FIG. 8 might both be given to the route calculation algorithm, with the best one being chosen depending upon the current vehicle position. On the display screen showing the list of access points, the name of the highway (which may include both the numbered and local names) is shown to remind the user to which highway these access points are related. When the user scrolls up and down the access point list, appropriate changes in the local highway name are reflected. The city or county in which the access point is located may also be displayed.

Figure 10:
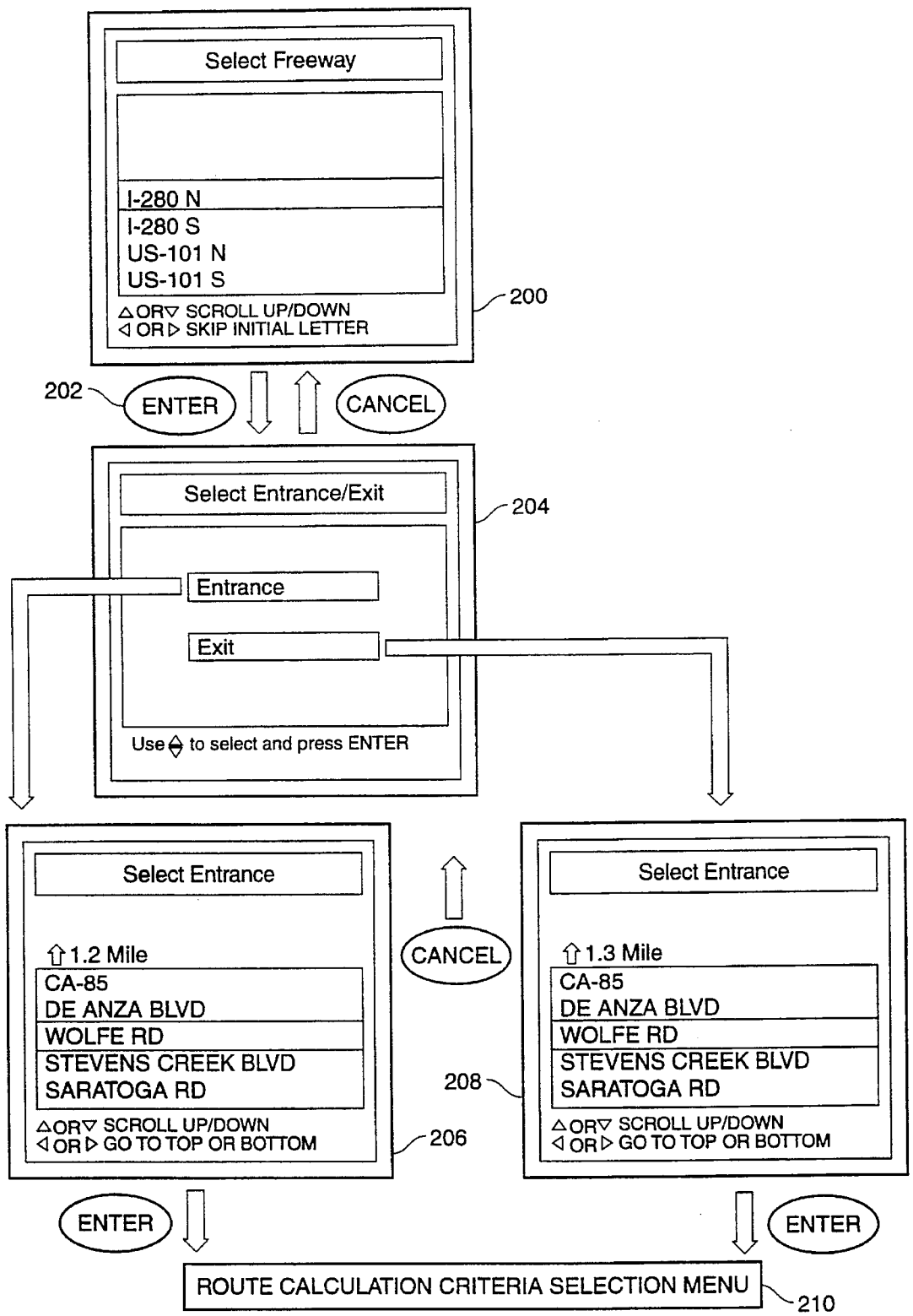
FIG. 10 is a series of display screens illustrating selection of a highway access point as a destination.

A series of display screens presented to a user of a vehicle navigation system designed according to one embodiment of the present invention is shown in FIG. 10. In this example, the user desires merely to get on a particular freeway, Interstate 280 North. Display screen 200, the "Select Freeway" screen, shows I-280 North highlighted. By the user pressing "Enter" button 202, the system advances to screen 204, the "Select Entrance/Exit" screen. If an entrance is selected, the system advances to "Select Entrance" screen 206. If an exit is selected, the system advance to "Select Exit" screen 208. When either an entrance or an exit is selected, the system advances to Route Calculation Criteria Selection menu 210 to proceed with the calculation of the route to the selected destination.

While the invention has been particularly shown and described with reference to specific embodiments thereof, it will be understood by those skilled in the art that the foregoing and other changes in the form and details may be made therein without departing from the spirit or scope of the invention.

What is claimed is:

1. A method for identifying highway access ramps in a database medium for use as locations for route calculation, the database medium having a plurality of highways stored therein, the method comprising the steps of:

(a) identifying first road segments in the database medium which belong to the highways and which have at least one highway access ramp connected thereto, each first road segment corresponding to a particular highway and being characterized by a highway direction and a position on the particular highway;

(b) sorting the first road segments according to the particular highway to which each first road segment belongs;

(c) determining the highway direction corresponding to each first road segment;

(d) sorting the first road segments of a first highway according to the highway direction to which each first road segment corresponds;

(e) sorting the first road segments of the first highway and of each highway direction according to the position of each first road segment in the first highway, thereby forming a highway segment list for each direction of the first highway;

(f) identifying the at least one highway access ramp connected to each first road segment in the highway segment list;

(g) storing ramp data in the database medium for each of the highway access ramps identified in step (f) so that the highway access ramps are operable to be employed as locations for route calculation; and (h) repeating steps (d)–(g) for selected highways in the database medium.

2. The method of claim 1 wherein the step of identifying first road segments comprises:

(i) selecting a second road segment from the plurality of road segments in the database medium;

(j) designating the second road segment as a first road segment if a speed limit associated with the second road segment exceeds a threshold speed limit, the second road segment is part of a numbered highway, the second road segment is not a highway access ramp, and the second road segment is connected to at least one highway access ramp; and (k) repeating steps (i) and (j) for each road segment in the database medium.

3. The method of claim 1 wherein the step of determining the highway direction for each first road segment comprises examining a highway suffix associated with the first road segment in the database medium.

4. The method of claim 1 wherein the step of determining the highway direction for each first road segment comprises examining highway sign text associated with the first road segment in the database medium.

5. The method of claim 1 wherein the step of determining the highway direction for each first road segment comprises examining a highway suffix associated with a second road segment connected to the first road segment in the database medium.

6. The method of claim 1 wherein the step of determining the highway direction for each first road segment comprises examining highway sign text associated with a second road segment connected to the first road segment in the database medium.

7. The method of claim 1 wherein the step of determining the highway direction for each first road segment comprises assigning a first highway orientation for an even numbered highway and assigning a second highway orientation for an odd numbered highway.

8. The method of claim 1 wherein the step of identifying the at least one highway access ramp comprises:

(i) selecting a second road segment from the highway segment list;

(j) determining a set of highway access ramps connected to the second road segment, thereby generating a ramp list;

(k) selecting a first highway access ramp from the ramp list;

(l) identifying at least one road to which the first highway access ramp is connected;

(m) designating the first highway access ramp according to the at least one road identified; and (n) repeating steps (k)–(m) for each highway access ramp in the ramp list.

9. The method of claim 8, further comprising the step of identifying the first highway access ramp as an on-ramp or an off-ramp.

10. The method of claim 9 wherein the step of identifying the first highway access ramp comprises examining highway sign text associated with the first highway access ramp in the database medium.

11. The method of claim 1 wherein the ramp data comprises at least one street name for each highway access ramp, the at least one street name corresponding to at least one street to which a corresponding highway access ramp is connected.

12. The method of claim 11 wherein the ramp data further comprises a geographic area name for each highway access ramp, and distances between consecutive highway access ramps on a common highway.

* * * * *